United States Patent
DePottey et al.

(10) Patent No.: US 7,121,576 B2
(45) Date of Patent: Oct. 17, 2006

(54) AIRBAG RETENTION COLLAR FOR AIRBAG MODULE ASSEMBLY

(75) Inventors: Timothy A. DePottey, Flint, MI (US); Larry D. Rose, South Weber, UT (US)

(73) Assignee: Autoliv ASP Inc., Ogden, UT (US)

( * ) Notice: Subject to any disclaimer, the term of this patent is extended or adjusted under 35 U.S.C. 154(b) by 338 days.

(21) Appl. No.: 10/789,922

(22) Filed: Feb. 27, 2004

(65) Prior Publication Data
US 2005/0189739 A1  Sep. 1, 2005

(51) Int. Cl.
   *B60R 21/16* (2006.01)
(52) U.S. Cl. .............. 280/728.2; 280/740
(58) Field of Classification Search ......... 280/728.2, 280/740, 742, 741
   See application file for complete search history.

(56) References Cited

U.S. PATENT DOCUMENTS

| | | | |
|---|---|---|---|
| 3,640,546 A | 2/1972 | Brawn | |
| 4,332,398 A | 6/1982 | Smith | |
| 4,842,300 A | 6/1989 | Ziomek et al. | |
| 5,087,067 A | 2/1992 | Seki et al. | |
| 5,172,933 A | 12/1992 | Strasser | |
| 5,326,131 A * | 7/1994 | Yokota et al. | 280/728.2 |
| 5,398,968 A | 3/1995 | Emambakhsh et al. | |
| 5,405,164 A | 4/1995 | Paxton et al. | |
| 5,454,586 A | 10/1995 | Rogerson | |
| 5,746,447 A | 5/1998 | Dyer et al. | |
| 5,884,939 A | 3/1999 | Yamaji et al. | |
| 5,944,344 A | 8/1999 | Yoshioka et al. | |
| 5,988,677 A | 11/1999 | Adomeit et al. | |
| 6,029,996 A * | 2/2000 | Yoshioka et al. | 280/740 |
| 6,113,134 A | 9/2000 | Lim | |
| 6,142,519 A | 11/2000 | Smith | |
| 6,193,269 B1 * | 2/2001 | Amamori | 280/728.2 |
| 6,209,911 B1 * | 4/2001 | Igawa et al. | 280/740 |
| 6,227,560 B1 | 5/2001 | Volkmann et al. | |
| 6,460,885 B1 | 10/2002 | Bowser et al. | |
| 6,533,312 B1 | 3/2003 | Labrie et al. | |
| 6,607,210 B1 | 8/2003 | Eckert et al. | |
| 6,851,703 B1 * | 2/2005 | Dahmen | 280/728.2 |
| 2005/0062262 A1 * | 3/2005 | Williams | 280/728.2 |

FOREIGN PATENT DOCUMENTS

| | | |
|---|---|---|
| EP | 0 607 671 | 3/1997 |
| JP | 6 227 353 | 8/1994 |

* cited by examiner

*Primary Examiner*—Paul N. Dickson
*Assistant Examiner*—Drew J. Brown
(74) *Attorney, Agent, or Firm*—Sally J. Brown

(57) ABSTRACT

An airbag retention collar for attaching an inflatable airbag cushion in an airbag module assembly including a module canister and a side discharge inflator device. The retention collar includes a bent plate adapted to overlie the side discharge inflator device. A first mounting flange is disposed at a first end of the bent plate and a second mounting flange is disposed at a second end of the bent plate opposite the first end. The first and second mounting flanges each extend at an angle from the bent plate. The retention collar also includes a diffuser flange extending from the bent plate and a plate opening in the bent plate. The plate opening is disposed between the diffuser flange and the first mounting flange and is adapted to receive an inflator diffuser of the inflator device, such that the inflator diffuser extends through the plate opening to be disposed between the diffuser flange and the first mounting flange.

26 Claims, 4 Drawing Sheets

AIRBAG RETENTION COLLAR FOR AIRBAG MODULE ASSEMBLY

BACKGROUND OF THE INVENTION

This invention relates generally to inflatable safety restraint devices such as airbag installations for automobiles and, more particularly, to airbag retention collars such as for attaching inflatable airbag cushions in airbag module assemblies employing side discharge inflator devices.

It is well known to protect a vehicle occupant by means of safety restraint systems which self-actuate from an undeployed or static state to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushion(s) may desirably deploy into one or more locations within the vehicle between the occupant and certain parts of the vehicle interior, such as the doors, steering wheel, dashboard or the like, to prevent or avoid the occupant from forcibly striking such parts of the vehicle interior.

Various types or forms of such passive restraint assemblies have been developed or tailored to provide desired vehicle occupant protection based on either or both the position or placement of the occupant within the vehicle and the direction or nature of the vehicle collision. Automotive passenger side airbag installations generally incorporate an airbag module assembly having an inflator device within a module canister and an inflatable airbag cushion adapted to inflate out a side of the module canister. In one currently used passenger side airbag module assembly configuration the inflatable airbag cushion is adapted to inflate out a top side of the module canister, often referred to as a "top mounted" airbag cushion. Such a module assembly is installed in the dashboard of the automobile close to the windshield. Upon activation, the inflator device releases inflation gas which inflates the airbag cushion. The top mounted airbag cushion initially inflates toward the windshield and then rapidly rolls down the dashboard in a direction toward the passenger.

Current passenger side airbag module assemblies often incorporate a generally elongated and cylindrically shaped end discharge inflator device within a module canister. An "end discharge" inflator device refers to an inflator device including an inflator diffuser element, for diffusing the thrust of the exiting inflation gas, typically disposed over an inflation gas exit area at one of the opposing ends of the cylindrical inflator device. The end discharge inflator device is generally positioned within the module canister, and an additional module diffuser element is typically disposed between the end discharge inflator device and the inflatable airbag cushion.

A side discharge inflator device is an alternative inflator device design to the end discharge inflator devices discussed above. In a side discharge inflator device, the inflation gas exit area and the inflator diffuser element, if used, are not located at one of the opposing ends of the cylindrical inflator device, but typically centrally located on the cylindrical body of the inflator device. An advantage of a side discharge inflator device is that the inflation gas can be released in a central area of the airbag module assembly, as compared to an end area, and directly into a central area of the associated inflatable airbag cushion. However, a more concentrated discharge in a central area of the inflatable airbag cushion may not be desirable if efforts are directed to obtain a more uniform airbag cushion deployment to minimize or avoid inflation forces on the automobile windshield and/or minimize or avoid risk of injury to an out-of-position occupant, i.e., an occupant not seated in the optimal passenger riding position. In addition, the inflation gas exiting a side discharge inflator device can cause or result in bell-mouthing of the module canister. "Bell-mouthing" refers to a deformation of the module canister, generally around the open end, or "mouth," of the module canister, as a result of the forces produced during and associated with bag deployment.

There is a need for a passenger side airbag module assembly that more uniformly distributes inflation gas and the resulting inflation forces to a full width of the inflating airbag cushion. More particularly, there is a need for an airbag module assembly that incorporates a side discharge inflator, is relatively easy to assemble and promotes distribution of inflation gas across a width of the airbag cushion during earlier stages of deployment to reduce inflation forces exerted on the automobile windshield and/or minimize or avoid risk of injury to an out-of-position occupant.

There is also a need for a passenger side airbag module assembly having increased support in an area generally surrounding the inflator diffuser of a side discharge inflator such as to reduce, minimize or prevent bell mouthing of the module canister.

SUMMARY OF THE INVENTION

A general object of the invention is to provide an improved passenger side airbag module assembly having uniform airbag cushion deployment.

A more specific objective of the invention is to overcome one or more of the problems described above.

The general object of the invention can be attained, at least in part, through an airbag retention collar for attaching an airbag cushion in an airbag module assembly, the airbag module assembly including a module canister and a side discharge inflator device. The retention collar includes a bent plate adapted to overlie the side discharge inflator device. A first mounting flange is disposed at a first end of the bent plate and a second mounting flange is disposed at a second end of the bent plate opposite the first end. The first and second mounting flanges each extend at an angle from the bent plate. The retention collar includes a diffuser flange extending from the bent plate. The retention collar also includes a plate opening in the bent plate. The plate opening is disposed between the diffuser flange and the first mounting flange and is adapted to receive an inflator diffuser of the inflator device, such that the inflator diffuser extends through the plate opening to be disposed between the diffuser flange and the first mounting flange.

The prior art generally fails to disclose an airbag module assembly that includes a side discharge inflator device and that uniformly distributes inflation gas to inflate an associated airbag cushion during earlier stages of airbag deployment, such as, for example, prior to the airbag cushion rolling down the automobile dashboard toward the occupant.

The invention further comprehends an airbag module assembly for an inflatable restraint device system. The airbag module assembly includes a module canister defining a canister chamber. The module canister has a canister base. The module canister includes spaced first and second sidewalls connected to the canister base. The module canister also has spaced first and second endwalls connected to the canister base. The module canister additionally includes a pocket defining a pocket volume. The pocket volume is disposed on an outer side of the module canister opposite the canister chamber and is adapted to receive an inflator device. The pocket has a pocket opening connecting the pocket volume and the canister chamber. A side discharge inflator device is disposed at least partially within the pocket volume. The inflator device includes a body and an inflator diffuser connected to the body. The inflator diffuser extends through the pocket opening into the canister chamber. An airbag retention collar is connected to the canister within the canister chamber. The airbag retention collar includes a bent plate overlying the pocket, a first mounting flange extending at an angle from the bent plate at a first end of the bent plate and adjacent the first side wall, and a second mounting flange extending at an angle from the bent plate at a second end of the bent plate opposite the first end and adjacent the canister base. The airbag retention collar includes a diffuser flange extending from the bent plate. The airbag retention collar also includes a plate opening in the bent plate, the plate opening disposed between the diffuser flange and the first mounting flange. The plate opening is aligned with the pocket opening and the inflator diffuser extends through the pocket opening and is disposed between the diffuser flange and the first mounting flange. An inflatable airbag cushion is connected to the airbag retention collar and, in a static state, is disposed in the canister chamber.

Other objects and advantages will be apparent to those skilled in the art from the following detailed description taken in conjunction with the appended claims and drawings.

BRIEF DESCRIPTION OF THE DRAWINGS

FIG. 3 shows the opposite side of the airbag module assembly shown in FIG. 2.

FIG. 5 shows the opposite side of the airbag module assembly shown in FIG. 4.

DETAILED DESCRIPTION OF THE INVENTION

The present invention provides an airbag retention collar for attaching an inflatable airbag cushion in an airbag module assembly. The airbag retention collar of this invention can be used to attach an airbag cushion to a module for a side discharge inflator device. The airbag retention collar of this invention also provides desirable reinforcement to portions of the airbag module assembly and promotes improved inflation gas distribution within the inflating airbag cushion.

Figure 1:
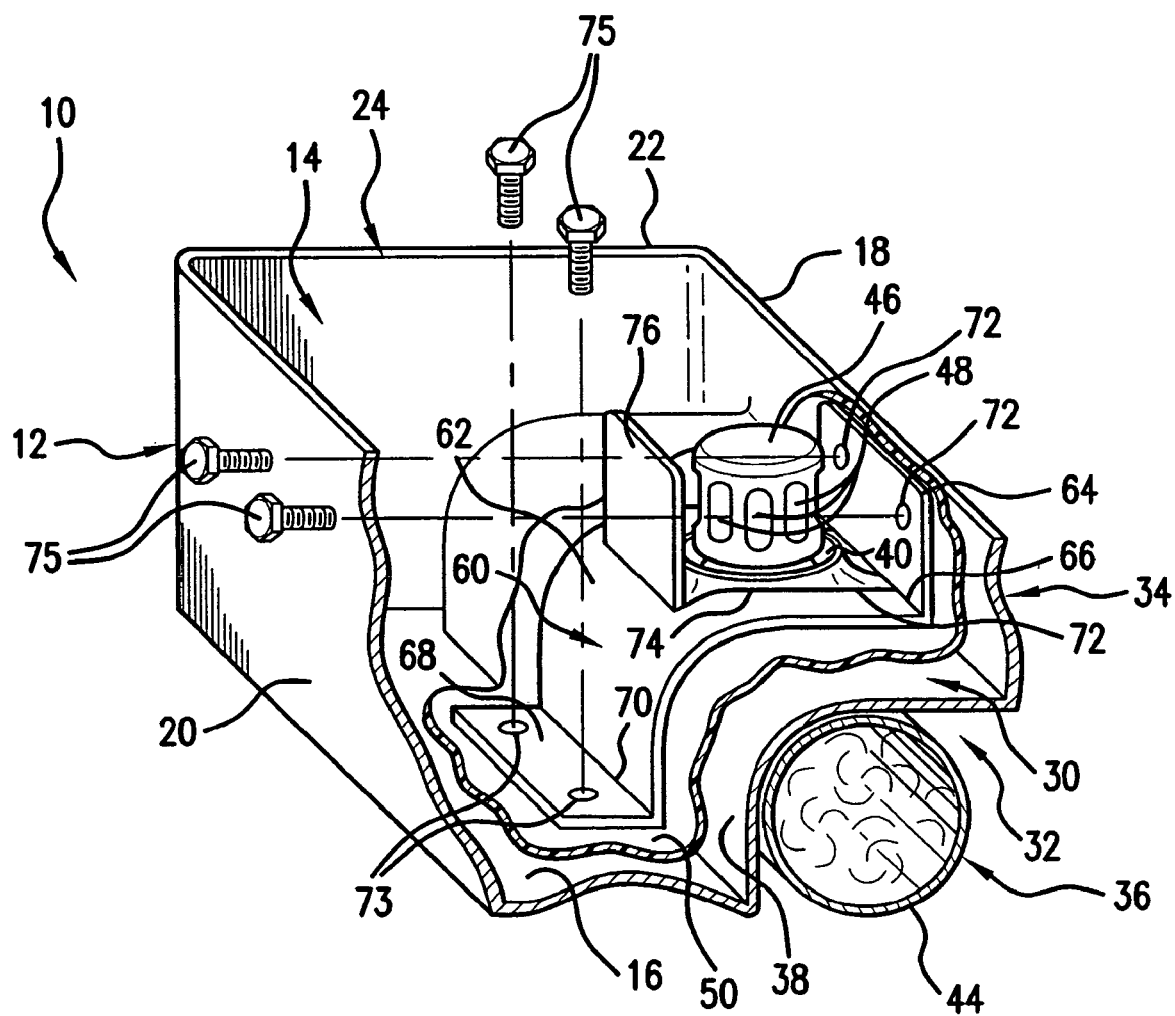
FIG. 1 is a partially in section, fragmentary view of an airbag module assembly for a passenger side inflatable restraint device system according to one embodiment of this invention.

FIG. 1 shows a partially in section, fragmentary view of a passenger side airbag module assembly 10 according to one embodiment of this invention. The airbag module assembly 10 includes a generally rectangular module canister 12 defining a canister chamber 14. The module canister 12 includes a canister base 16. The module canister 12 also includes a first sidewall 18 and a second sidewall 20 connected to the canister base 16. The module canister 12 also includes first endwall 22 connected to the canister base 16, and extending between the first sidewall 18 and the second sidewall 20. A second endwall (not shown) is connected to the canister base 16 at an opposite end from the first endwall 22. The module canister 12 is open at a top end 24 that is opposite the canister base 16 to receive a folded airbag cushion into the canister chamber 14 and to allow the airbag cushion to exit the canister chamber 16 during inflation.

Figure 4:
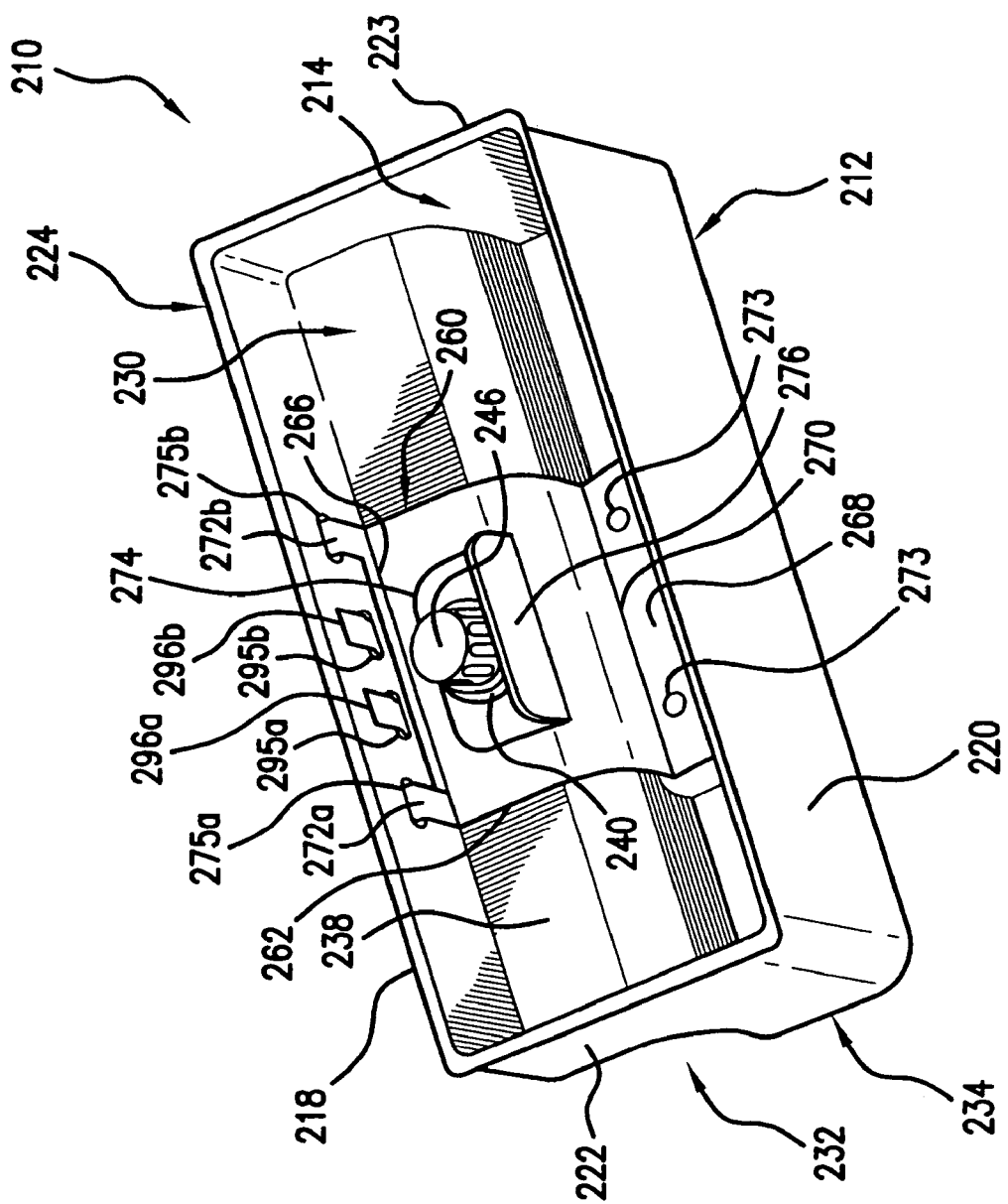
FIG. 4 is a perspective view of an airbag module assembly for a passenger side inflatable restraint device system according to yet another embodiment of the invention.
Figure 5:
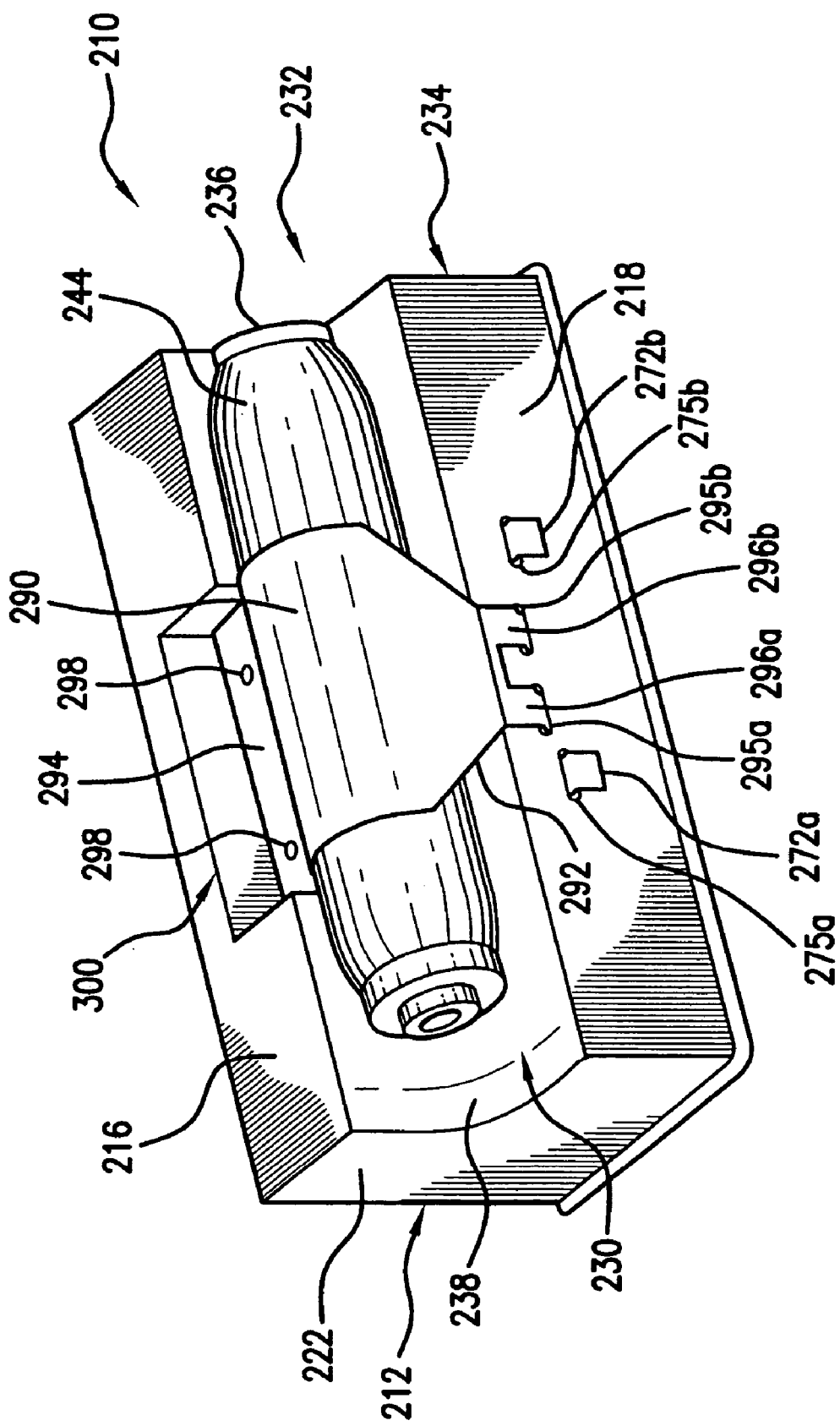
FIG. 5 is another perspective view of the airbag module assembly shown in FIG. 4.

The module canister 12 includes a pocket 30 defining a pocket volume 32. The pocket volume 32 is disposed on an outer side 34 of the module canister 12 and is adapted to receive an inflator device 36. The pocket 30 includes a bent wall portion 38 extending from the first sidewall 18 to the canister base 16. The pocket 30 has a length that does not extend an entire length of the canister chamber 14. In such an embodiment, the pocket bent wall portion 38 is connected to two opposing end portions (not shown in FIG. 1) to form a pocket volume 32 that has a length less than the full length of the module canister 12. As will be appreciated by one skilled in the art following the teachings herein provided, in an alternative embodiment, such as shown in FIGS. 4 and 5 and described below, the pocket bent wall portion, and thus the pocket, can extend along the entire length of the canister base and the first sidewall. In one embodiment of the invention, the length of the pocket is predetermined to form a pocket volume having a length at least sufficient to receive the inflator device. As will also be appreciated, the size, shape, construction and configuration of the pocket can be appropriately varied dependent on factors such as the size, shape and configuration of the inflator device. The pocket 30 also includes a pocket opening 40 connecting the pocket volume 32 and the canister chamber 14.

The inflator device 36 shown in FIG. 1 is a side-discharge inflator device. The inflator device 36 includes a substantially cylindrical body 44 and an inflator diffuser 46 connected to the body 44. The inflator diffuser 46 is centrally disposed on an elongated side of the inflator device body 44, thereby providing a side discharge of inflation gas. Upon activation of the inflator device 36, inflation gas exits the inflator device 36 through gas exit holes 48 in the inflator diffuser 46.

As discussed above, the pocket 30 is desirably configured to form a pocket volume 32 for receiving the side discharge inflator device 36. The pocket bent wall portion 38 is thus desirably correspondingly curved to the size and shape of the inflator device cylindrical body 44 to provide the pocket volume 32 which is adapted to receive the inflator device 36. In addition, the pocket opening 40 is desirably disposed in a position to receive the inflator diffuser 46. The inflator device 36 is disposed at least partially within the pocket volume 32 and the inflator diffuser 46 extends through the pocket opening 40 into the canister chamber 14.

An inflatable airbag cushion 50 is connected to the module canister 12 and over the inflator diffuser 46 by an airbag retention collar 60. The inflatable airbag cushion 50 has a cushion opening (not shown in FIG. 1) through which the inflator diffuser 46 extends. A portion of the inflatable airbag cushion surrounding the cushion opening is disposed between the airbag retention collar 60 and the module canister 12. When in a static state, before inflation occurs, the inflatable airbag cushion 50 is folded and at least partially disposed within the canister chamber 14, such as in a folded form, as is known in the art. For simplicity, only a portion of the inflatable airbag cushion 50 is shown in FIG. 1 to illustrate the connection of the inflatable airbag cushion 50 to the module canister 12 by the airbag retention collar. When folded and placed into the canister chamber 14, a portion of the inflatable airbag cushion 50 extends over the inflator diffuser 46.

The airbag retention collar 60 includes a bent plate 62 overlying the pocket 30 and the inflator device 36. A first mounting flange 64 extends at an angle from the bent plate 62 at a first end 66 of the bent plate 62. A second mounting flange 68 extends at an angle from the bent plate 62 at a second end 70 of the bent plate 62 opposite the first end 66. The first mounting flange 64 extends from the bent plate 62 in a first plane that is generally parallel to the first side wall 18, such that the first mounting flange 64 is adjacent the first sidewall 18. Similarly, the second mounting flange 68 extends from the bent plate 62 in a second plane that is generally parallel to the canister base 16, such that the second mounting flange 68 is adjacent the canister base 16. In the embodiment of the invention shown in FIG. 1, the first plane is substantially perpendicular to the second plane, as the first sidewall 18 is disposed substantially perpendicular to the canister base 16.

The first mounting flange 64 includes a first pair of collar connector openings 72 and the second mounting flange 68 includes a second pair of collar connector openings 73. In one embodiment of this invention, the airbag retention collar 60 is connected to the module canister 12 by studs, shown in FIG. 1 as bolts 75, that extend through the collar connector openings 72 and 73. As will be appreciated by one skilled in the art following the teachings herein provided, alternative connecting means, such as known in the art are available for connecting the airbag retention collar to the module canister and can, if desired, be used.

The bent plate 62 is curved to correspondingly fit over the pocket bent wall portion 38 and the inflator device 36. A plate opening 74 in the bent plate 62 is aligned with the pocket opening 40 and allows the inflator diffuser 46 to extend into the canister chamber 14. The plate opening 74 is disposed between a diffuser flange 76 and the first mounting flange 64. The inflator diffuser 46 extends through both the pocket opening 40 and the plate opening 74 and is disposed between the diffuser flange 76 and the first mounting flange 64.

The diffuser flange 76 extends outward from the bent plate 62 substantially parallel to the first mounting flange 64. As will be appreciated by those skilled in the art and guided by the teachings herein provided, the diffuser flange 76 can desirably serve to deflect inflation gas exiting the inflator diffuser 46 toward the opposing first endwall 22 and second endwall (not shown). In other words, the thrust of inflation gas exiting the inflator diffuser 46 toward the diffuser flange 76 is desirably redirected by the diffuser flange 76 toward the opposing endwalls that are disposed perpendicular to the diffuser flange. In one embodiment of the invention, the diffuser flange 76 is stamped out of the bent plate 62, i.e., cut out of the bent plate 62 on three sides of the diffuser flange 76, and bent outwards from the bent plate 62. As will also be appreciated, forming the diffuser flange 76 in this manner also forms the plate opening 74 in the bent plate 62.

Those skilled in the art and guided by the teachings herein provided will appreciate that the airbag retention collar diffuser flange of the invention provides various benefits. For example, the diffuser flange can reduce or eliminate bell-mouthing, as defined above, of the module canister due to inflation gas forces by deflecting the inflation gas to the outward endwalls of the module canister. The diffuser flange may also facilitate a more uniform distribution of inflation gas through the inflatable airbag cushion during inflation. Uniform gas distribution can be desirable to reduce or minimize inflation forces on the automobile windshield and/or reduce or minimize risk of injury to an out-of-position occupant. The uniform gas distribution provided by the airbag retention collar of the invention can allow for a wider and/or narrower module canister as may be desired in particular installations, and can allow the airbag module assembly to be placed in the automobile dashboard closer to the windshield.

Figure 2:
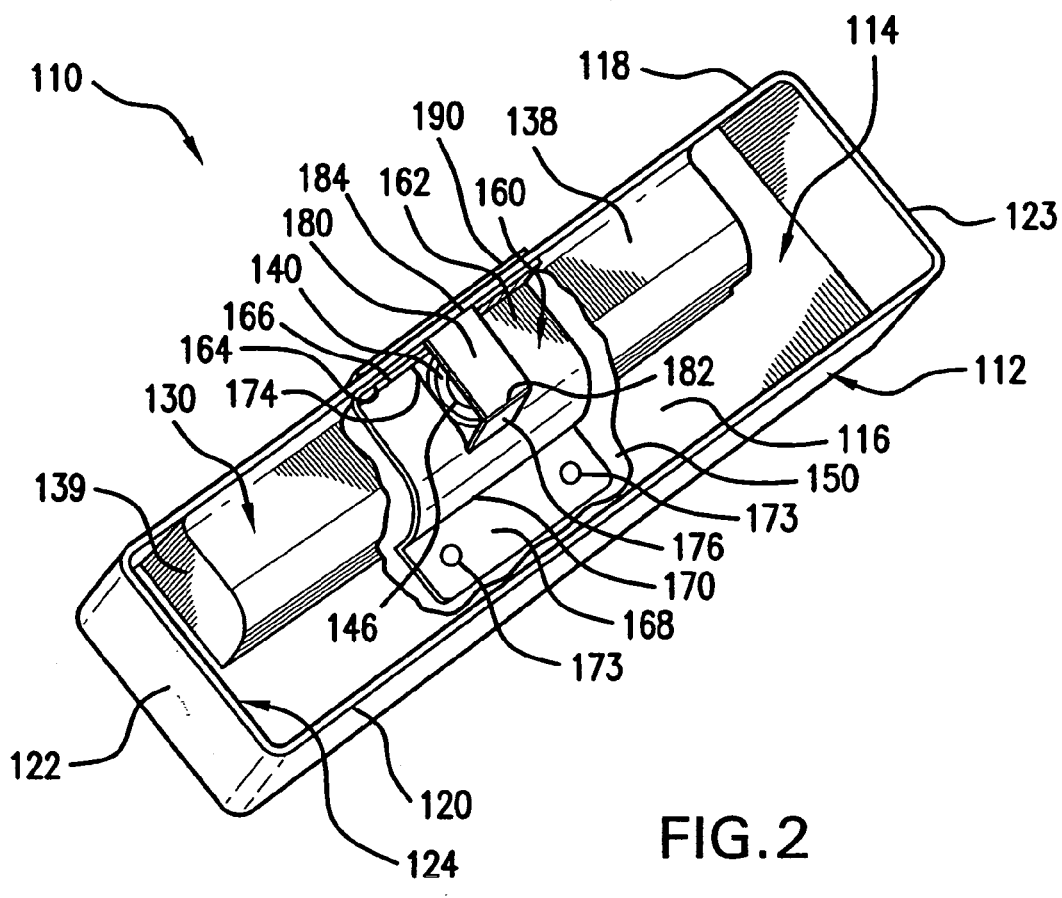
FIG. 2 is a fragmentary perspective view of an airbag module assembly for a passenger side inflatable restraint device system according to another embodiment of the invention.
Figure 3:
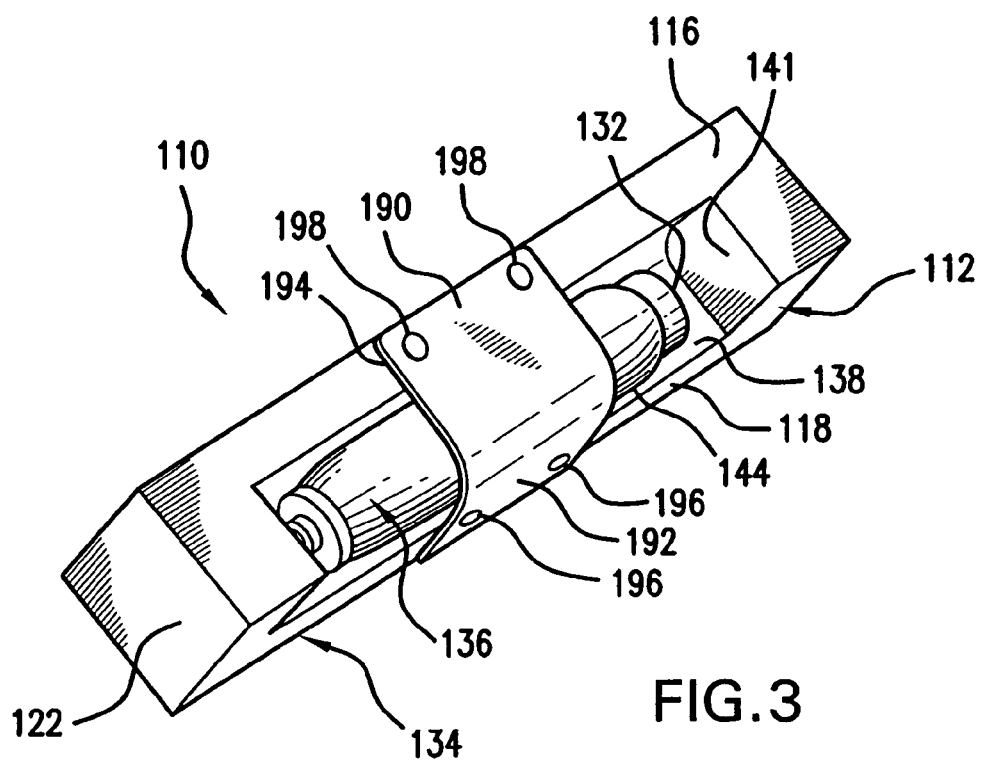
FIG. 3 is another perspective view of the airbag module assembly shown in FIG. 2.

FIGS. 2 and 3 show an airbag module assembly 110 for an inflatable restraint device system according to another embodiment of the invention. FIG. 2 shows one side of the airbag module assembly 110, and FIG. 3 shows an opposite side of the airbag module assembly 110. As shown in FIG. 2, the airbag module assembly 110 includes a module canister 112 defining a canister chamber 114. The module canister 112 includes a first sidewall 118, a second sidewall 120, a first endwall 122, and a second endwall 123, each connected to a canister base 116. The first and second sidewalls 118, 120 are spaced apart from each other and disposed at opposite sides of the canister base 116. The first and second endwalls 122, 123 are also spaced apart from each other and disposed at opposite sides of the canister base 116. An open canister top end 124 is on an opposite side of the canister chamber 114 from the canister base 116.

The module canister 112 includes a pocket 130 defining a pocket volume 132, shown in FIG. 3, disposed on a module canister outer side 134 opposite the canister chamber 114. Referring to both FIGS. 2 and 3, the pocket 130 includes a bent wall portion 138 connected to a first pocket end portion 139 and a second pocket end portion 141, the second pocket end portion 141 at a side of the bent wall portion 138 opposite the first pocket end portion 139. The bent wall portion 138 and the pocket end portions 139, 141 form and/or define the pocket volume 132. The pocket volume 132 is adapted to receive an inflator device 136. Referring again to FIG. 2, the pocket 130 has a pocket opening 140 connecting the pocket volume 132 and the canister chamber 114.

An airbag retention collar 160 is connected to the module canister 112 within the canister chamber 114. The airbag retention collar 160 includes a bent plate 162 appropriately curved to overlie the pocket 130 and the inflator device 136. The airbag retention collar 160 includes a first mounting flange 164 that extends at an angle from the bent plate 162 at a bent plate first end 166 and that is adjacent the first sidewall 118. The airbag retention collar 160 also includes a second mounting flange 168 that extends at an angle from the bent plate 162 at a bent plate second end 170 and that is adjacent the canister base 116.

The airbag retention collar 160 overlies the pocket 130 such that a plate opening 174 of the bent plate 162 is aligned with the pocket opening 140. The plate opening 174 is formed in the bent plate 162 between a diffuser flange 176 extending from the bent plate 162 and the first mounting flange 164. The diffuser flange 176 extends outward from the bent plate 162 substantially parallel to the first mounting flange 164. As discussed above, inflation gas exiting the inflator diffuser 146 can be desirably deflected by the diffuser flange 176 toward both the first endwall 122 and the second endwall 123.

An inflatable airbag cushion 150 is connected to the airbag retention collar 160, and at least a portion of the inflatable airbag cushion 150 is disposed between the airbag retention collar 160 and the module canister 112. The inflatable airbag cushion 150 includes a cushion opening (not shown) that is aligned with and disposed between the plate opening 174 and the pocket opening 140. In a static state before inflation, the inflatable airbag cushion 150 is folded and placed within the canister chamber 114. During inflation, the inflating airbag cushion 150 exits the canister chamber 114 through the open canister top end 124.

The inflatable airbag cushion 150 is inflated by inflation gas from a side discharge inflator device 136. As shown in FIG. 3, the inflator device 136 is disposed within the pocket volume 132. The inflator device 136 includes a cylindrical body 144 and an inflator diffuser, such as described above with reference to FIG. 1, centrally disposed on a side of the inflator device body 144. As will be appreciated by one skilled in the art guided by the teachings herein provided, to provide a properly sized pocket volume for receiving the cylindrical inflator device, the pocket bent wall portion can be curved and sized as needed to provide an appropriately sized pocket volume that is adapted to receive a correspondingly sized and/or shaped inflator device.

The inflator diffuser extends through the pocket opening 140, the cushion opening (not shown) of the airbag cushion, and the plate opening 174 into the canister chamber 114. The inflator diffuser is disposed between the diffuser flange 176 and the first mounting flange 164. In addition, as the cushion opening surrounds the inflator diffuser 146, the inflator diffuser 146 is disposed within an inflation chamber (not shown) of the inflatable airbag cushion 150. Upon activation of the inflator device 136, the inflator device 136 produces and releases inflation gas into the airbag cushion inflation chamber, thereby inflating the inflatable airbag cushion 150.

In the embodiment of the invention shown in FIG. 2, the airbag retention collar 160 includes an optional deflection member 180. The deflection member 180 is disposed over the plate opening 174 and, thus, over the inflator device inflator diffuser 146. The deflection member 180 extends from the diffuser flange 176 to the first mounting flange 164. The deflection member 180 is connected to the diffuser flange 176 at a first deflection member end 182 and is connected to the first mounting flange 164 at a second deflection member end 184 opposite the first deflection member end 182. The deflection member 180 extends over the area of inflation gas discharge from the inflator diffuser 146 and generally reduces the forces against the automobile windshield from the inflation gas and/or the inflating airbag cushion 150. In addition, as a portion of one side of the inflatable airbag cushion 150 extends over the inflator diffuser 146 when the inflatable airbag cushion 150 is in a static state and within the canister chamber 114, the deflection member 180 and/or the diffuser flange of this invention can keep the inflatable airbag cushion 150 from directly contacting the inflator diffuser 146. Keeping the inflatable airbag cushion from contacting the inflator diffuser can be desirable in particular embodiments of the invention where the inflator diffuser can become hot during the release of inflation gas and may damage the portion of the airbag cushion in contact therewith.

As shown in FIG. 3, the inflator device 136 is secured in the pocket volume 132 by an inflator bracket 190. The inflator bracket 190 is connected to the outer side 134 of the module canister 112 and disposed over at least a portion of the inflator device body 144. The inflator bracket 190 includes a first arm 192 connected to the first side wall 116 and a second arm 194 connected to the canister base 116. In one preferred embodiment of the invention, the inflator bracket arms 192, 194 are each on opposite sides of the module canister 112 from, and aligned with, the airbag retention collar first and second mounting flanges 164, 168, respectively. As shown in FIGS. 2 and 3, the inflator bracket first arm 192 is aligned with and connected to the first mounting flange 164 through the module canister first side wall 118 and the second arm 194 of the inflator bracket is aligned with and connected to the second mounting flange 168 through the module canister base 116. Connecting the inflator bracket 190 to the airbag retention collar 160 through the module canister 112 provides a stronger, more durable connection of both the inflator bracket 190 and the airbag retention collar 160 to the module canister 112. A stronger, more durable connection can be desirable for maintaining the integrity of the airbag module assembly 110 during inflation of the airbag and for reducing or eliminating bell-mouthing.

In one embodiment of the invention, the inflator bracket 190 includes connector openings disposed in alignment with corresponding connector openings of the airbag retention collar 160. The inflator bracket 190 is connected to the airbag retention collar 160 by studs, or other connection means, that extend through respective pair of aligned connector openings and the module canister 112. Referring to FIG. 2, the airbag retention collar first mounting flange 164 includes a first pair of collar connector openings (not shown) and the airbag retention collar second mounting flange 168 includes a second pair of collar connector openings 173. As shown in FIG. 3, the inflator bracket first arm 192 includes a first pair of bracket connector openings 196 and the inflator bracket second arm 194 includes a second pair of bracket connector openings 198. The inflator bracket 190 is aligned with the airbag retention collar 160 on the opposite side of the module canister such that each of the first pair of bracket connector openings 196 is aligned with a corresponding connector opening of the first pair of collar connector openings 172. Similarly, each of the second pair of bracket connector openings 198 is aligned with a corresponding connector opening of the second pair of collar connector openings 173.

In another embodiment of the invention, the airbag retention collar is connected to the module canister at one mounting flange by at least one flange attachment tab or hook that extends through a corresponding slit opening in the module canister. During assembly of the airbag module assembly, each of the at least one flange attachment tab is/are at least partially inserted, desirably inserted about halfway, into a corresponding slit opening and the airbag retention collar is rotated, or tilted, into its final position. The other mounting flange on the opposite side of the airbag retention collar is attached to the module canister by another connecting means, such as by studs described above. Similarly, the inflator bracket can be attached to the module canister at one arm of the inflator bracket by at least one bracket attachment tab or hook that extends through a corresponding slit opening in the module canister. The use of such attachment tabs and slit openings can eliminate studs and/or fasteners on one side of the airbag module assembly. As will be appreciated, reducing the amount of studs and/or fasteners can provide benefits, such as, for example, fewer parts required for assembly, thereby reducing assembly time and cost.

FIGS. 4 and 5 show an airbag module assembly 210 for an inflatable restraint device system according to an embodiment of the invention using attachment tabs, such as described above, for connecting the airbag retention collar and the inflator bracket to the module canister. FIG. 4 shows one side of the airbag module assembly 210, and FIG. 5 shows an opposite side of the airbag module assembly 210. As shown in FIG. 4, the airbag module assembly 210 includes a module canister 212 defining a canister chamber 214. The module canister 212 includes a first sidewall 218, a second sidewall 220, a first endwall 222, and a second endwall 223, each connected to a canister base 216. The first and second sidewalls 218, 220 are spaced apart from each other and disposed at opposite sides of the canister base 216. The first and second endwalls 222, 223 are also spaced apart from each other and disposed at opposite sides of the canister base 216. An open canister top end 224 is on an opposite side of the canister chamber 214 from the canister base 216.

The module canister 212 includes a pocket 230 defining a pocket volume 232 disposed on a module canister outer side 234 opposite the canister chamber 214. Referring to both FIGS. 4 and 5, the pocket 230 includes a bent wall portion 238. The bent wall portion 238 is curved to extend from the first sidewall 218 to the canister base 216. The bent wall portion 238 in this embodiment of the invention extends a full length of the canister chamber 214, extending from the first endwall 218 to the second endwall 220. The pocket volume 232 is adapted to receive an inflator device 236. Referring again to FIG. 4, the pocket 230 has a pocket opening 240 connecting the pocket volume 232 and the canister chamber 214.

An airbag retention collar 260 is connected to the module canister 212 within the canister chamber 214. The airbag retention collar 260 includes a bent plate 262 appropriately curved to overlie the pocket 230 and the inflator device 236. The airbag retention collar 260 includes a first mounting flange 264 that extends at an angle from the bent plate 262 at a bent plate first end 266 and that is adjacent the first sidewall 218. The airbag retention collar 260 also includes a second mounting flange 268 that extends at an angle from the bent plate 262 at a bent plate second end 270 and that is adjacent the canister base 216.

The airbag retention collar 260 overlies the pocket 230 such that a plate opening 274 of the bent plate 262 is aligned with the pocket opening 240. The plate opening 274 is formed in the bent plate 262 between a diffuser flange 276 extending from the bent plate 262 and the first mounting flange 264. The diffuser flange 276 extends outward from the bent plate 262 substantially parallel to the first mounting flange 264. As discussed above, inflation gas exiting the inflator diffuser 246 can be desirably deflected by the diffuser flange 276 toward both the first endwall 222 and the second endwall 223.

The first mounting flange 264 includes two flange attachment tabs, individually designated 272a and 272b. Each of the flange attachment tabs 272a, 272b extend through a corresponding slit openings 275a and 275b, respectively, in the first sidewall 218, thereby connecting the first mounting flange 264 to the first sidewall 218. In one embodiment of the invention, to connect the first mounting flange 264 to the first sidewall 218, the flange attachment tabs 272a, 272b are first partially inserted through the respective slit openings 275a, 275b and, with the flange attachment tabs 272a, 272b disposed partially through the slit openings 275a, 275b, the airbag retention collar 260 is rotated toward the canister base 216 into place. As shown in FIG. 5, a portion of each of the flange attachment tabs 272a, 272b is disposed on the module canister outer side 234. As will be appreciated by one skilled in the art following the teachings herein provided, the upward orientation of the flange attachment tabs 272a, 272b can work against the snap force of an inflating airbag cushion.

Desirably, each of the flange attachment tabs 272a, 272b include a curved portion, such as a S-curved portion, that aligns with and/or is disposed in the slit openings 275a, 275b, respectively, to allow the flange attachment tabs 272a, 272b to fit flush with the first sidewall 218, i.e., having one portion of each flange attachment tab 272a, 272b abutting an inner side of the first sidewall 218 and another portion of each flange attachment tab 272a, 272b abutting an opposing outer side of the first sidewall 218. Bending or deforming of the first sidewall 218 in an area around the respective slit openings 275a, 275b caused by the flange attachment tabs 272a, 272b can be reduced or eliminated by including the attachment tab curved portion between the portion of each flange attachment tab 272a, 272b abutting the inner side of the first sidewall 218 and the portion of each flange attachment tab 272a, 272b abutting the outer side of the first sidewall 218.

Upon partially inserting the flange attachment tabs through the slit openings 275a, 275b in the first sidewall 218, the airbag retention collar 260 is rotated toward the canister base 216 and fit into place. The second mounting flange 268 includes two connector openings 273 through which studs (not shown for simplicity), such as described above, can be fastened to connect the second mounting flange 268 to the canister base 216. When the airbag retention collar 260 is rotated into place, the flange attachment tabs 272a, 272b are adjacent and desirably substantially parallel to the first sidewall 218. The airbag retention collar 260 is thus secured to the airbag canister 212 with only one pair of studs.

An inflatable airbag cushion (not shown in FIGS. 4 and 5 for simplicity) is connected to the airbag retention collar 260 in a manner such as described above with reference to FIGS. 1 and 2. At least a portion of the inflatable airbag cushion is disposed between the airbag retention collar 260 and the module canister 212. The inflatable airbag cushion includes a cushion opening (not shown) that is aligned with and disposed between the plate opening 274 and the pocket opening 240. In a static state before inflation, the inflatable airbag cushion is folded and placed within the canister chamber 214. During inflation, the inflating airbag cushion exits the canister chamber 214 through the open canister top end 224.

The inflatable airbag cushion is inflated by inflation gas from the side discharge inflator device 236. As shown in FIG. 5, the inflator device 236 is disposed within the pocket volume 232. The inflator device 236 includes a cylindrical body 244 and an inflator diffuser 246, shown in FIG. 4, centrally disposed on a side of the inflator device body 244. As will be appreciated by one skilled in the art guided by the teachings herein provided, to provide a properly sized pocket volume for receiving the cylindrical inflator device, the pocket bent wall portion can be curved and sized as needed to provide an appropriately sized pocket volume that is adapted to receive a correspondingly sized and/or shaped inflator device.

The inflator diffuser 246 extends through the pocket opening 240, the cushion opening of the airbag cushion (not shown), and the plate opening 274 into the canister chamber 214. The inflator diffuser 246 is disposed between the diffuser flange 276 and the first mounting flange 264. In addition, as the cushion opening surrounds the inflator diffuser 246, the inflator diffuser 246 is disposed within an inflation chamber (not shown) of the inflatable airbag cushion. Upon activation of the inflator device 236, the inflator device 236 produces and releases inflation gas into the airbag cushion inflation chamber, thereby inflating the inflatable airbag cushion.

As shown in FIG. 5, the inflator device 236 is secured in the pocket volume 232 by an inflator bracket 290. The inflator bracket 290 is connected to the outer side 234 of the module canister 212 and disposed over at least a portion of the inflator device body 244. The inflator bracket 290 includes a first arm 292 connected to the first side wall 216 and a second arm 294 connected to the canister base 216. In one preferred embodiment of the invention, the inflator bracket arms 292, 294 are each on opposite sides of the module canister 212 from, and aligned with, the airbag retention collar first and second mounting flanges 264, 268, respectively.

The first arm 292 of the inflator bracket 290 includes two bracket attachment tabs 296a, 296b. Each of the bracket attachment tabs 296a, 296b extends through a corresponding slit opening 295a, 295b, respectively, in the first sidewall 218, thereby connecting the first arm 292 to the first sidewall 218. In one embodiment of the invention, to connect the first arm 292 to the first sidewall 218, the bracket attachment tabs 296a, 296b are first partially inserted through the respective slit opening 295a, 295b and, with the bracket attachment tabs 296a, 296b extending partially through the slit openings 295a, 295b, the inflator bracket 290 is rotated toward the canister base 216 into place. As shown in FIG. 4, a portion of each of the bracket attachment tabs 296a, 296b is disposed within the module canister chamber 214.

Desirably, each of the bracket attachment tabs 296a, 296b include a curved portion, such as a S-curved portion, that aligns with and/or is disposed in the slit openings 295a, 295b to allow the bracket attachment tabs 296a, 296b to fit flush with the first sidewall 218, i.e., having one portion of each bracket attachment tab 296a, 296b abutting an outer side of the first sidewall 218 and another portion of each bracket attachment tab 296a, 296b abutting an opposing inner side of the first sidewall 218. Bending or deforming of the first sidewall 218 in an area around the respective slit openings 295a, 295b caused by the bracket attachment tabs 296a, 296b can be reduced or eliminated by including the attachment tab curved portion between the portion of each bracket attachment tab 296a, 296b abutting the outer side of the first sidewall 218 and the portion of each bracket attachment tab 296a, 296b abutting the inner side of the first sidewall 218.

Upon inserting the bracket attachment tabs 296a, 296b through the slit openings 295a, 295b, respectively, in the first sidewall 218, the inflator bracket 290 is rotated toward the canister base 216 and fit into place. The second arm 294 of the inflator bracket 290 includes two connector openings 298 through which studs (not shown) can be fastened to connect the second arm 294 to the canister base 216. When the inflator bracket 290 is rotated into place, the bracket attachment tabs 296a, 296b are adjacent and desirably substantially parallel to the first sidewall 218. The inflator bracket 290 is thus secured to the airbag canister 212 using only one pair of studs.

As shown in FIGS. 4 and 5, the sidewall 218 includes four aligned slit openings 275a, 275b, 295a, 295b. The two slit openings 295a, 295b are disposed in the first sidewall 218 between the two slit openings 275a, 275b. The flange attachment tabs 272a, 272b are disposed at opposing side edges of the first mounting flange 264 and adapted to extend through the outer slit openings 275a, 275b, respectively. The bracket attachment tabs 296a, 296b are disposed more toward a center of the first arm 292 of the inflator bracket 290 and adapted to extend through the middle slit openings 295a, 295b, respectively. As will be appreciated by one skilled in the art following the teachings herein provided, various size, shapes and configurations of the flange attachment tabs, the bracket attachment tabs, and the slit openings are available for the airbag module assembly of this invention. For example, in one embodiment of this invention, the module canister sidewall includes four slit openings, such as shown in FIGS. 4 and 5, and two flange attachment tabs extend through two middle slit openings, respectively, and two bracket attachment tabs extend through two outer slit openings, respectively.

As shown in FIGS. 4 and 5, the inflator bracket second arm 294 of the inflator bracket 290 is aligned with and can be connected by two studs to the second mounting flange 268 through the module canister base 216. The canister base 216 also includes an optional recess 300 into which at least a portion of the second arm 294 of the inflator bracket 290 fits. The connector openings 298 of the second arm 294 of the inflator bracket 190 are each disposed in alignment with a corresponding connector opening 273 of the second mounting flange 268. The second arm 294 is connected to the second mounting flange 268 by studs (not shown), or other connection means, that extend through a pair of aligned connector openings 273, 298 and the module canister 212.

Thus, the invention provides an airbag retention collar for attaching an inflatable airbag cushion to an airbag module assembly. The airbag retention collar of the invention can both strengthen the module canister in an area of greatest inflation gas forces and deflect inflation gas toward the lateral ends of the module canister, thereby decreasing bell-mouthing of the module canister. By directing inflation gas from a side discharge inflator to the lateral ends of the module canister during inflation, the airbag retention collar also promotes a uniform distribution of inflation gas across the width of the inflatable airbag cushion. The gas distribution provided by the airbag retention collar of the invention can minimize inflation forces on an automobile windshield and can minimize the risk of injury to an out-of-position occupant. The airbag retention collar of the invention can allow for a wider and/or narrower airbag module assembly that can be positioned within an automobile dashboard closer to the windshield.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag retention collar for attaching an airbag cushion in an airbag module assembly, the airbag module assembly including a module canister and a side discharge inflator device, the retention collar comprising:

a bent plate adapted to overlie the side discharge inflator device;

a first mounting flange disposed at a first end of the bent plate and a second mounting flange disposed at a second end of the bent plate opposite the first end, the first and second mounting flanges each extending at an angle from the bent plate;
a diffuser flange extending from the bent plate; and
a plate opening in the bent plate, the plate opening disposed between the diffuser flange and the first mounting flange, wherein the plate opening is adapted to receive an inflator diffuser of the inflator device and the inflator diffuser extends through the plate opening to be disposed between the diffuser flange and the first mounting flange.

2. The airbag retention collar according to claim 1 additionally comprising a deflection member disposed over the plate opening.

3. The airbag retention collar according to claim 2 wherein the deflection member comprises a first deflection member end and a second deflection member end opposite the first deflection member end, the deflection member connected to the diffuser flange at the first deflection member end and connected to the first mounting flange at the second deflection member end.

4. The airbag retention collar according to claim 1 wherein the side discharge inflator device includes a substantially cylindrical body and the bent plate is a curved plate.

5. The airbag retention collar according to claim 1 wherein the diffuser flange is cut out of the bent plate and bent outwards.

6. The airbag retention collar according to claim 1 wherein the first mounting flange extends in a first plane and the second mounting flange extends in a second plane, wherein the first plane is substantially perpendicular to the second plane.

7. The airbag retention collar according to claim 6 wherein the diffuser flange extends from the bent plate substantially parallel to the first mounting flange.

8. The airbag retention collar according to claim 1 wherein one of the first and second mounting flanges comprises at least one flange attachment tab, each of the at least one flange attachment tab adapted to extend through a corresponding slit opening in the module canister.

9. The airbag retention collar according to claim 1 wherein the module canister includes a portion disposed between the bent plate and the side discharge inflator device.

10. An airbag module assembly for an inflatable restraint device system, comprising:
a module canister defining a canister chamber, the module canister including a canister base and spaced first and second sidewalls and first and second endwalls connected to the canister base, the module canister also including a pocket defining a pocket volume disposed on an outer side of the module canister opposite the canister chamber and adapted to receive an inflator device, the pocket having a pocket opening connecting the pocket volume and the canister chamber;
a side discharge inflator device disposed at least partially within the pocket volume, the inflator device including a body and an inflator diffuser connected to the body, wherein the inflator diffuser extends through the pocket opening into the canister chamber;
an airbag retention collar connected to the canister within the canister chamber, the airbag retention collar including:
a bent plate overlying the pocket;
a first mounting flange extending at an angle from the bent plate at a first end of the bent plate and adjacent the first side wall;
a second mounting flange extending at an angle from the bent plate at a second end of the bent plate opposite the first end and adjacent the canister base;
a diffuser flange extending from the bent plate; and
a plate opening in the bent plate, the plate opening disposed between the diffuser flange and the first mounting flange, wherein the plate opening is aligned with the pocket opening and the inflator diffuser extends through the pocket opening and is disposed between the diffuser flange and the first mounting flange; and
an inflatable airbag cushion connected to the airbag retention collar, the inflatable airbag cushion in a static state disposed in the canister chamber.

11. The airbag module assembly according to claim 10 wherein a portion of the inflatable airbag cushion is disposed between the airbag retention collar and the module canister.

12. The airbag module assembly according to claim 10 wherein the inflatable airbag cushion comprises a cushion opening and the inflator diffuser extends through the cushion opening.

13. The airbag module assembly according to claim 12 additionally comprising a deflection member disposed over the inflator diffuser, the deflection member including a first deflection member end and a second deflection member end opposite the first deflection member end, the deflection member connected to the diffuser flange at the first deflection member end and connected to the first mounting flange at the second deflection member end.

14. The airbag module assembly according to claim 10 wherein one of the first and second mounting flanges comprises at least one flange attachment tab, each of the at least one flange attachment tab adapted to extend through a corresponding slit opening in one of the first sidewall and the canister base.

15. The airbag module assembly according to claim 10 additionally comprising an inflator bracket connected to an outer surface of the module canister and disposed over at least a portion of the inflator device.

16. The airbag module assembly according to claim 15 wherein a first arm of the inflator bracket is connected to the first mounting flange through the module canister first side wall and a second arm of the inflator bracket is connected to the second mounting flange through the module canister base.

17. The airbag module assembly according to claim 16 wherein the inflator bracket first arm includes a first bracket connector opening disposed in alignment with a corresponding first collar connector opening of the first mounting flange and the inflator bracket second arm includes a second bracket connector opening disposed in alignment with a corresponding second collar connector opening of the second mounting flange.

18. The airbag module assembly according to claim 15 wherein the inflator bracket comprises a first arm adjacent the first side wall and a second arm adjacent the canister base, wherein one of the first arm and the second arm comprises at least one bracket attachment tab, each of the at least one bracket attachment tab adapted to extend through a corresponding slit opening in one of the first side wall and the canister base.

19. The airbag module assembly according to claim 18 wherein one of the first and second mounting flanges comprises at least one flange attachment tab, each of the at least one flange attachment tab adapted to extend through a corresponding slit opening in one of the first side wall and the canister base.

20. The airbag module assembly according to claim 19 wherein the first mounting flange comprises the at least one flange attachment tab, the first arm of the inflator bracket comprises the at least one bracket attachment tab, each of the at least one flange attachment tab and each of the at least one bracket attachment tab extends through a corresponding slit opening in the first sidewall, and the second arm of the inflator bracket is connected to the second mounting flange through the canister base.

21. The airbag module assembly according to claim 19 wherein the first mounting flange comprises two flange attachment tabs, the first arm of the inflator bracket comprises two bracket attachment tabs, and the first sidewall comprises four slit openings.

22. The airbag module assembly according to claim 10 wherein the pocket comprises a bent wall portion connected to two opposing end portions, the bent wall portion and the end portions forming the pocket volume for receiving the side discharge inflator device.

23. The inflatable restraint device according to claim 10 wherein the side discharge inflator device includes a substantially cylindrical body and the bent plate is a curved plate.

24. The airbag module assembly according to claim 23 wherein the pocket comprises a curved wall portion connected to two opposing end portions, the curved wall portion and the end portions forming the pocket volume for receiving the substantially cylindrical side discharge inflator device body.

25. The airbag module assembly according to claim 23 wherein the inflator diffuser is centrally disposed on a side of the inflator device body.

26. The airbag module assembly according to claim 10 wherein the diffuser flange extends from the bent plate substantially parallel to the first mounting flange.

* * * * *